United States Patent [19]

Yoshiike et al.

[11] Patent Number: 4,711,815
[45] Date of Patent: Dec. 8, 1987

[54] RECORDING MEDIUM

[75] Inventors: Nobuyuki Yoshiike, Ikoma; Shigeo Kondo, Hirakata, both of Japan

[73] Assignee: Matsushita Electric Industrial Co., Ltd., Osaka, Japan

[21] Appl. No.: 835,787

[22] Filed: Mar. 3, 1986

[30] Foreign Application Priority Data

| Mar. 7, 1985 | [JP] | Japan | 60-45414 |
| Mar. 12, 1985 | [JP] | Japan | 60-49022 |
| Mar. 15, 1985 | [JP] | Japan | 60-53110 |
| Mar. 15, 1985 | [JP] | Japan | 60-53116 |
| Mar. 15, 1985 | [JP] | Japan | 60-53117 |

[51] Int. Cl.$^4$ .................. B32B 9/04; G01D 15/10; G01D 9/00; G01D 15/24
[52] U.S. Cl. ............................ 428/411.1; 428/914; 430/945; 346/135.1; 346/137; 346/74.7; 427/148
[58] Field of Search .................. 428/411.1, 914; 430/945; 346/74 L, 135.1, 137.1; 427/148, 150

[56] References Cited

U.S. PATENT DOCUMENTS

| 3,932,025 | 1/1976 | Lakatos et al. | 350/160 R |
| 4,151,748 | 5/1979 | Baum | 73/356 |
| 4,172,605 | 10/1979 | Welsch et al. | 282/27.5 |
| 4,548,889 | 10/1985 | Nemoto et al. | 430/273 |

Primary Examiner—John E. Kittle
Assistant Examiner—Patrick J. Ryan
Attorney, Agent, or Firm—Stevens, Davis, Miller & Mosher

[57] ABSTRACT

This invention relates to a recording medium in which a transition metal oxide showing photochromism is used as the recording layer and the said recording layer or an upper layer adjacent to the recording layer is made to carry a proton donor. This recording medium makes it possible to improve the change efficiency of optical density change produced by optical writing.

10 Claims, 7 Drawing Figures

RECORDING MEDIUM

TECHNICAL FIELD

This invention relates to a recording medium capable of storing, reproducing, and erasing voices, images, and electric signals.

BACKGROUND ART

As means for storing, reproducing and erasing voices, images, and electric signals, there have been used magnetic memory systems and optical memory systems. Optical memory systems have recently attracted attention since they allow a high memory density as compared with magnetic memory systems. Optical memory systems used include, for example, (1) one in which laser beams corresponding to signals are irradiated to a TeC recording film or the like film on acrylic resin substrate to make holes by thermal mode and to record information thereby and (2) one in which $TeO_x$ film or the like is used as the recording film and irradiated with laser beams to undergo a change of crystalline state-amorphous state by thermal mode and thereby to change states of different light reflectivity.

The recording materials used in these systems all utilize the change of state caused by thermal mode, give a low writing response speed, do not always have a good thermal stability, and hence have a drawback in reliability.

Among optical recording systems, a new system is attracting attention in recent years in which recording is effected by optical mode utilizing photochromism. This system, in which the recording material is colored (a new light absorption band is generated therein) by laser beam irradiation and the resulting change in the spectrum is utilized for recording, generally enables a recording with a high response speed and with a high reliability in thermal stability as compared with recording by thermal mode.

There are many kinds of photochromic materials usable in this system including organic and inorganic compounds. Transition metal oxides can also be used. For example, when tungsten oxide ($WO_3$) or molybdenum oxide ($MoO_3$) is used among transition metal oxides and when a colorless $WO_3$ layer or $MoO_3$ layer is irradiated with a light having an energy higher than the band gap of $WO_3$ or $MoO_3$, the irradiated part changes a blue color. This color does not fade for a long time unless a reverse reaction is conducted thermally, electrolytically or chemically. The color change of $WO_3$ layer or $MoO_3$ layer caused by said irradiation of light can be utilized to effect optical recording.

As a prior art example using the above-mentioned compounds, there may be mentioned U.S. Pat. No. 4,548,889 disclosing an optical recording medium using such oxides as $MoO_{3-x}$ and $WO_3$ ($x<0.5$). However, said patent differs from the present invention in that the former does not make it a requisite to make the recording layer (transition metal oxide layer) or an upper layer adjacent to the recording layer containing a proton donor.

The term "proton donor" herein refers generically to a compound capable of releasing $H^+$ by ionic dissociation etc.

DISCLOSURE OF THE INVENTION

This invention provides a recording medium with a recording layer having a high coloring (photochromic) efficiency by using a transition metal oxide, particularly tungsten oxide ($WO_3$) or molybdenum oxide ($MoO_3$), a photochromic material, as a recording material by optical mode, which is of an utterly different nature from that of prior art recording material by thermal mode, to form a recording layer, and making the said recording layer or an upper layer adjacent to the recording layer containing a proton donor. Further, in general, the fading and deterioration of a colored state proceed chemically by the action of oxygen in the air in particular, and it is effective for prevention thereof to provide a protective film on the coloring layer. This invention further provides a recording medium having a high coloring efficiency and an excellent memory effect by making the said protective layer containing a proton donor. Further, this invention provides a recording medium having a further excellent memory effect by coating the recording layer with a substrate having a low oxygen permeability by using an adhesive containing a proton donor.

Further, this invention makes it possible, by proper selection of conditions for vapor deposition of transition metal oxides forming the recording layer, to make the recording layer itself containing a proton donor such as adsorption water and thus to provide a recording medium having a high coloring efficiency.

Further, this invention can provide a recording medium which allows not only recording but also erasing by providing the said recording layer on an electrode and making the layer contact with an opposite electrode through solid electrolyte.

Further, this invention. make it possible to improve the recording density by changing the intensity of laser beams used for writing and thereby changing the developed color density stepwise. Further, when recording materials having a wide band gap such as $WO_3$ and $MoO_3$ are used, since the optical writing is performed by a light of short wavelength shorter than (440 nm) the recording density can be further increased by reducing the area of the light spot. It is needless to say that these recording materials are essentially stable to visible lights and thus can form a recording medium having a high reliability.

BEST MODE FOR CARRYING OUT THE INVENTION

This invention will be described below with reference to Examples.

EXAMPLE 1

Figure 1:
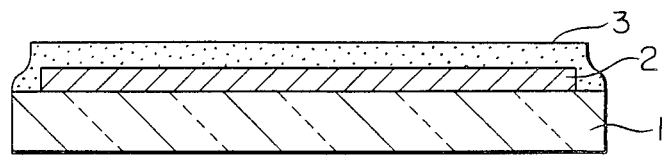
FIG. 1 is a sectional view showing the basic construction of a recording medium in one Example of this invention, coloring layer 2 comprising a transition metal oxide is formed on a substrate 1 and a protective layer 3 is laminated thereon.

As shown in FIG. 1, a $WO_3$ layer or $MoO_3$ layer was provided in a thickness of 1,000 to 20,000 Å as a coloring layer 2 by means of vapor deposition or sputtering on a substrate 1 formed of glass, plastics, metals or ceramics. Then, a metal oxide was covered as a protective film 3 on the said coloring layer by means of vapor deposition. After said covering, the substrate was stored for 1 hour in an atmosphere saturated with water, an acid or an alcohol vapor, which are proton donors, to adsorb the proton donor to the protective film.

Each of the samples obtained above was irradiated with pulse light ($\lambda=337.1$ nm, $t=200$ ps) using a $N_2$ laser. The irradiated part developed a blue color. The optical density of colored part was measured by using a He-Ne laser ($\lambda=632.8$ nm). The change in the optical density ($\Delta OD$) after the coloration was shown in Table 1 for representative samples.

TABLE 1

| Sample No. | Photochromic materials | Protective film | Proton donor | $\Delta OD$ |
|---|---|---|---|---|
| 1 | $WO_3$ | $SiO_2$ | None | 0.01 |
| 2 | " | $SiO_2$ | Water | 0.30 |
| 3 | " | $SiO_2$ | Formic acid | 0.28 |
| 4 | " | $Al_2O_3$ | Water | 0.25 |
| 5 | " | $TiO_2$ | " | 0.26 |
| 6 | $MoO_3$ | $ZrO_2$ | " | 0.23 |
| 7 | " | $V_2O_5$ | " | 0.21 |
| 8 | " | $Nb_2O_5$ | " | 0.22 |
| 9 | " | $Ta_2O_5$ | " | 0.20 |
| 10 | " | $Cr_2O_3$ | " | 0.21 |
| 11 | " | $SiO_2$ | " | 0.27 |
| 12 | $V_2O_5$ | $SiO_2$ | " | 0.05 |
| 13 | $Nb_2O_5$ | $SiO_2$ | " | 0.04 |
| 14 | $TiO_2$ | $SiO_2$ | " | 0.06 |

Table 1 reveals that samples (No. 2 to No. 11) in which a proton donor was adsorbed to the protective film show an extremely excellent color developing efficiency as compared with a sample (No. 1) in which no proton donor was adsorbed.

Proton donors which were found to be effective were, besides water, methyl alcohol, ethyl alcohol, propyl alcohol, butyl alcohol, formic acid, acetic acid, oxalic acid, and hydrochloric acid.

As to the means of adsorbing (incorporating) a proton donor to the protective film, there were found to be preferable, besides the above-mentioned method, also a method of introducing a proton donor gas at the time of vapor deposition of the protective film and a method of immersing, after the vapor deposition of the protective film, the substrate in a liquid containing a proton donor as one component, for example water, acidic aqueous solutions, and alcohol solutions. Further, other transition metal oxides which can intercalate a proton, for example $V_2O_5$ (brown), $Nb_2O_5$ (blue) and $TiO_2$ (blue), could also be used as a color developing layer although they showed a low color developing efficiency.

The light source to be used for optical writing is not restricted to $N_2$ laser; He-Cd laser, Ar laser, Xe light source, and Hg light source could also be used.

EXAMPLE 2

A $WO_3$ layer was formed in a thickness of 3000 Å on a substrate in the same method as in Example 1. Various kinds of organic polymer films incorporated with a proton donor were then coated on the layer. The coating was conducted by dissolving a polymer and a proton donor (0.01 to 1%) in a solvent, and coating the resulting solution onto the layer by using a spinner followed by drying to form film.

Then, each of the samples thus prepared was irradiated by using a $N_2$ laser. The irradiated part developed a blue color.

The optical density of coloration part was measured by using a He-Ne laser. Table 2 shows $\Delta OD$ for representative samples.

TABLE 2

| Sample No. | Protective film | Proton donor | $\Delta OD$ |
|---|---|---|---|
| 1 | Polypropylene | Acrylic acid | 0.41 |
| 2 | Regenerated cellulose | Water | 0.42 |
| 3 | Modified polyethylene | Ethyl alcohol | 0.38 |
| 4 | Epoxy resin | methacrylic acid | 0.35 |
| 5 | Methacrylic resin | Methacrylic acid | 0.42 |
| 6 | Methacrylic resin | None | 0.10 |
| 7 | Polyvinyl alcohol | Acrylic acid | 0.41 |
| 8 | Polyvinyl alcohol | None | 0.15 |

Table 2 reveals that samples in which a proton donor was added to the protective film have an extremely excellent photochromic property as compared with those in which no proton donor was added.

A similar effect was confirmed as a protective film in the use of, besides the materials shown in Table 2, polyvinylidene chloride, polyvinyl chloride, polystyrene, ABS resin, polycarbonate, polyurethane, polyamide, cellulose acetate, silicone, natural rubber, polyester, nylon, phenol resin, urea resin, ionomer, diacryl phthalate, polyisobutyne, polyacetal, polyimide, polysulfone, nitrocellulose, polyether, or copolymers thereof. As proton donors, there were found to be effective, besides water, acrylic acid, methacrylic acid and ethyl alcohol shown in Table 2, compounds having an OH group such as methyl alcohol, propyl alcohol, butyl alcohol, ethylene glycol, glycerine, phenol, cresol, hydroquinone, and vinylsilanes having a silanol group; carboxylic acids such as oxalic acid, formic acid, acetic acid, maleic acid, malonic acid, succinic acid, adipic acid, butyric acid, valeric acid, terephthalic acid, and polyacrylic acid; and further hydroxy acids, alkoxy acids, oxoacids; sulfur-containing acids such as toluenesulfonic acid, butanesulfinic acid, sulfobenzoic acid, and polysulfonic acid; and inorganic acids such as nitric acid, hydrochloric acid, phosphoric acid, sulfuric acid, and silicic acid. A further enhanced effect was obtained when both of acid and alcohol were simultaneously added.

Suitable methods of adding a proton donor were one comprising mixing it with an organic polymer by using a solvent and one comprising impregnating the proton donor into an inorganic adsorbent such as finely divided silica and then mixing it with a polymer material.

EXAMPLE 3

Figure 2:
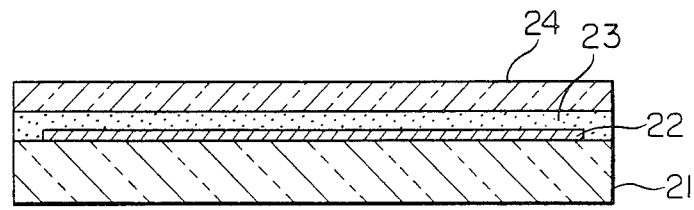
FIGS. 2 and 3 are each a sectional view showing a construction of a recording medium in another Example of this invention; numbers 21 and 31 denote each a substrate, 22 and 32 a coloring layer, 23 and 33 an adhesive, 24 and 34 a protective substrate, and 35 a protective film.

As shown in FIG. 2, a color developing layer 22 formed of $WO_3$ or $MoO_3$ was provided in a thickness of 1000 Å to 20,000 Å by means of vapor deposition or sputtering on a substrate 21 formed of glass, plastics, metals, or ceramics.

Then, a protective substrate 24 was bonded to the coloration layer side by using an adhesive 23.

In order to increase the coloring efficiency of the coloration layer in light irradiation, 0.01% to 5% of a proton donor was added beforehand to the adhesive.

After said adhesion, the samples thus obtained were irradiated with pulse light ($\lambda=337.1$ nm, $t=200$ ps) by using a $N_2$ laser to develop a blue color in the irradiated part. After coloration, the samples were examined for storage at 70° C. in the same method as in Example 1 and found to be stable, showing virtually no decrease in optical density. Adhesives which were found to be usable in this Example were those of epoxy, epoxyacrylate, ester acrylate, cyanoacrylate, spiroacetal, vinyl acetate, polyvinyl alcohol, chloroprene, nitro rubber, urea, melamine, phenol, and polyurethane type.

Proton donors which were tested and confirmed to be effective in this Example were compounds having an OH group such as methyl alcohol, ethyl alcohol, butyl alcohol, ethylene glycol, cresol, phenol, and hydroquinone, water, organic acids such as acrylic acid, methacrylic acid, formic acid, acetic acid, oxalic acid, maleic acid, malonic acid, succinic acid, adipic acid, butyric acid, valeric acid, terephthalic acid, polyacrylic acid, hydroxy acids, alkoxy acids, oxoacids, toluenesulfonic acid, butanesulfinic acid, and sulfobenzoic acid, and inorganic acids such as hydrochloric acid, nitric acid, phosphoric acid, silicic acid, and sulfuric acid. A larger effect was obtained when acid and alcohol were simultaneously added. Further, there were also found to be effective a method of adding a proton donor to the adhesive after supporting the donor on fine particle silica ($SiO_2$) or a method of adding a silane coupling agent.

As a protective substrate, there could be used glass, metal sheets, or plastics such as polyvinylidene chloride, polyacrylate, polyvinyl chloride, polystyrene, polyamide, polyimide, polycarbonate, ABS resin, polyurethane, silicone resin, cellulose acetate, natural rubber, polyester, nylon, phenol resin, urea resin, acryl phthalate, polyisobutyne, polyacetal, polysulfone, polyether, polyvinyl alcohol, epoxy resin, and methacrylic resin. Among these, those protective substrates were more effective which presumably had a low oxygen permeability, including those of glass, metal, acrylic resin, polyvinylidene chloride, polyimide, and polyamide.

Other transition metal oxides which can intercalate a proton, for example $V_2O_5$ (brown), $Nb_2O_5$ (blue) and $TiO_2$ (blue), could also be used as a coloring layer although they showed a low coloration efficiency.

EXAMPLE 4

Figure 3:
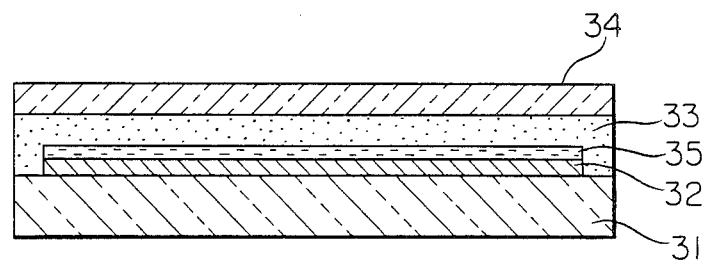

As shown in FIG. 3, a coloration layer 2 was provided in a thickness of 1000 to 20,000 Å on a substrate 31 in the same method as in Example 3. Then, as shown in FIG. 3, a protective film 35 was covered in a thickness of several thousand Å on the coloring layer 32. The protective film was formed of $SiO_2$, $Al_2O_3$, $TiO_2$, $ZrO_2$, $V_2O_5$, $Nb_2O_5$, $Ta_2O_5$ or $Cr_2O_3$. The protective film was made to contain a proton donor by storage the substrate in an atmosphere of the proton donor gas at the time of preparing the protective film, namely during vapor deposition, or after the preparation of the protective film. Thereafter a protective substrate 34 was bonded by using an adhesive 33 in the same manner as in Example 3. Materials of adhesives, protective substrate, and proton donors used were each the same as those described in Example 3. As a result, recording materials which gave a high optical density in writing were obtained by making the protective film 35 containg a proton donor.

EXAMPLE 5

Figure 4:
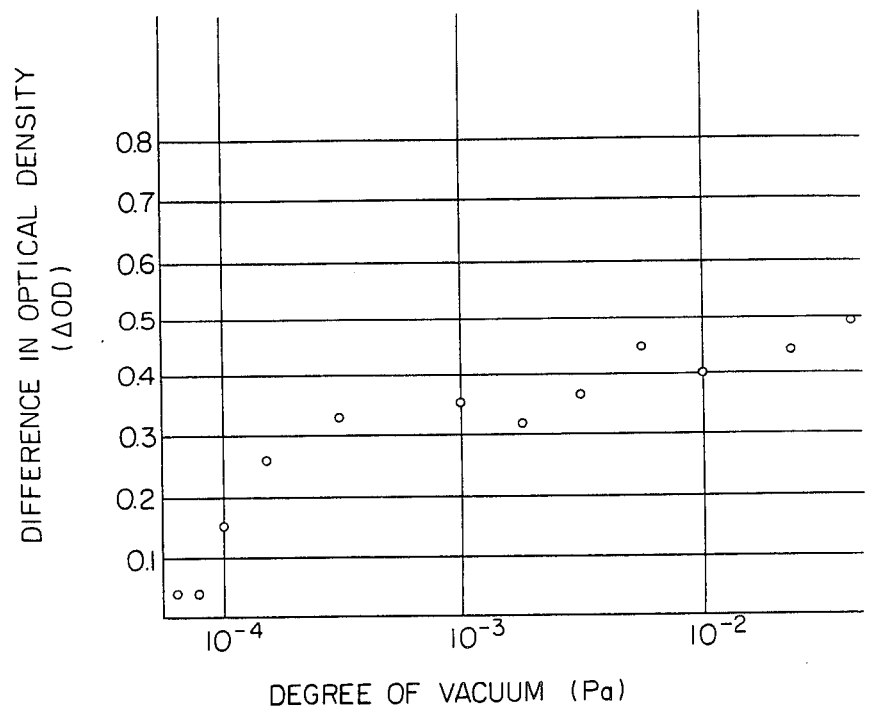
FIG. 4 is a graph showing the relation between the pressure in deposition of $WO_3$ film and the change in optical density of coloration by photochromism of the film, one of the recording materials according to this invention.

As shown in FIG. 1, $WO_3$ was deposited in a thickness of 3000 Å as a color developing layer 2 on a substrate 1 (glass, plastics, metals, or ceramics) by means of vacuum deposition (resistance heating method or electron beam method). The pressure in the deposition was $1\times10^{-4}$ Pa to $3\times10^{-2}$ Pa. The control of the pressure in the vapor deposition was conducted by introducing $N_2$ gas or air into the vapor deposition chamber. After vapor deposition, the sample thus obtained was taken out into the air, stored for a predetermined time, and irradiated with a pulse light ($\lambda=337.1$ nm, $t=200$ Ps) by using a $N_2$ laser to develop a blue color in the $WO_3$ layer of the irradiated part. The optical density of coloring part was measured by using a He-Ne laser ($\lambda=632.8$ nm). FIG. 4 shows the relation between the degree of vacuum in vapor deposition and the optical density of coloration for representative samples.

FIG. 4 reveals that a change of coloration higher than 0.15 in terms of the change in optical density (OD) can be achieved when the pressure in vapor deposition is not lower than $1\times10^{-4}$ Pa. Further, it has been revealed that the above-mentioned vapor-deposited film attaches only weakly to the substrate and easily peels off when the pressure is not lower than $3\times10^{-2}$ Pa.

Thus, it has been revealed that a recording film with an excellent coloring efficiency (OD>0.15) and an excellent stability can be obtained when the $WO_3$ film is formed by vapor deposition at a pressure P in the range of $1\times10^{-4}$ Pa$<$P$<3\times10^{-2}$ Pa.

A similar effect was confirmed when a similar experiment was conducted by using $MoO_3$ as the recording material.

Although the film thickness of the recording material in each of the Examples mentioned above was 3000 Å, a similar effect was confirmed when a film thickness in the range of 500 Å to 2 μm was used.

EXAMPLE 6

Figure 5:
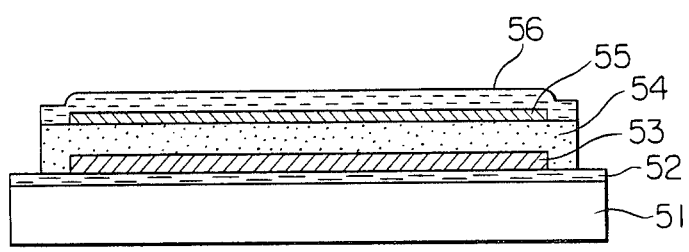
FIG. 5 is a sectional view showing the basic construction in another Example of this invention, namely that of a recording medium in which erasing is also possible after recording; 51 denotes a transparent substrate, 52 a transparent electrode, 53 a color developing layer, 54 a solid electrolyte, 55 a counter electrode reaction layer, and 56 the counter electrode.

As shown in FIG. 5, a transparent electrode 52 of ITO and the like was provided on a transparent substrate 51 of glass and the like, and a transition metal oxide ($WO_3$) 53 was deposited thereon in a thickness of 1000 to 10,000 Å by vapor deposition (or optionally by sputtering). Further, several hundred to several ten thousand Å of a solid electrolyte layer 54, several thousand Å of an counter electrode reaction layer 55, and the counter electrode 56 were successively laminated thereon to form a recording element.

The recording element mentioned above was irradiated from the transparent substrate 51 side by using a $N_2$ laser ($\lambda=337.1$ nm, $t=200$ ps). The irradiated part changed to a blue color. It has been found that, after coloration, the colored part can be memorized and stored for a long time. When a DC voltage of +1 to +3 V was impressed between the transparent electrode 52 and the counter electrode 56 by using the transparent electrode 52 as the positive electrode, the colored part erased and returned reversity to the original state.

The transition metal oxides which were examined in this Example and found to be usable were $WO_3$, $MoO_3$, $Nb_2O_5$, $TiO_2$, $Cr_2O_3$, $V_2O_5$, and $Ta_2O_5$. Materials particularly excellent in photochromic characteristics were $WO_3$ and $MoO_3$. They showed a change in optical density ($\Delta OD$) by light irradiation of about 0.2 to 0.4, which was about 100 times as great as that given by other materials.

The solid electrolytes used in this experiment were proton conduction materials such as $SiO_2 \cdot X(H_2O)$, antimonic acid, niobic acid, phosphotungstic acid, phosphomolybdic acid, silicotungstic acid, and silicomolybdic acid; $Li^+$ conduction materials such as $Li_3N$, $LiTaO_3$, $LiAlF_4$, $LiI$-$Li_3N$, $Li_2S$-$GeS_2$-$LiI$, $LiNbO_3$, and $Li$-$\beta$-$Al_2O_3$; and $Na^+$ conduction material such as $\beta$-$Al_2O_3$. They were applied by means of vapor deposition, sputtering or coating. Materials which gave good characteristics (particularly the erasing response of the colored part) among the solid electrolytes were a proton conduction material when used alone, and a $Li^+$ conduction material or a $Na^+$ conduction material which had been made to carry a proton conduction material or adsorption water when used as a mixture of conduction materials.

The counter electrode reaction layers used in this experiment were layers of metal hydroxides such as $Ir(OH)_x$, $Ni(OH)_x$, $W(OH)_x$, and $Ta(OH)_x$, Pd, hydrogen-occluding alloy, Li-occluding alloy, and thin metal films. Metal hydroxide layers and hydrogen-occluding alloys gave a particularly good erasing characteristic.

Besides glass, plastic sheets can be used as a transparent substrate. The transparent electrode may also be $In_2O_3$, $SnO_2$, or Au. The film of transition metal oxides may also be formed by sputtering. The transition metal oxides can be used either alone or as a mixed film.

EXAMPLE 7

As shown in FIG. 2, a tungsten oxide ($WO_3$) layer 22 was deposited in a thickness of 6000 Å as a recording material on a galss substrate 21 (or optionally, plastics, metals or ceramics) by vapor deposition. Then, a $SiO_x$ film 3 was deposited thereon in a thickness of 3000 Å as a protective film to prepare a recording material according to the procedures in Example 1.

The sample thus subjected to vapor deposition was irradiated for a predetermined time in an inert gas atmosphere by using a He-Cd laser ($\lambda = 325$ nm). The irradiated part changed to a blue color. The optical density of coloring part was measured by using a He-Ne laser ($\lambda = 632.8$ nm). The results obtained are shown in the Table 3.

TABLE 3

| Lot No. | Light irradiation time | Optical density changes ($\Delta OD$) |
|---|---|---|
| 1 | 10 msec | 0.03 |
| 2 | 50 msec | 0.12 |
| 3 | 100 msec | 0.22 |
| 4 | 200 msec | 0.45 |

Table 3 reveals that optical densities changes can be recorded in 4 varied steps in correspondence to states of different light irradiation times, namely states of different light irradiation energies. The light irradiation time can be controlled, in practice, by the number of times of irradiation of light pulses applied to the same recording part.

EXAMPLE 8

Figure 6:
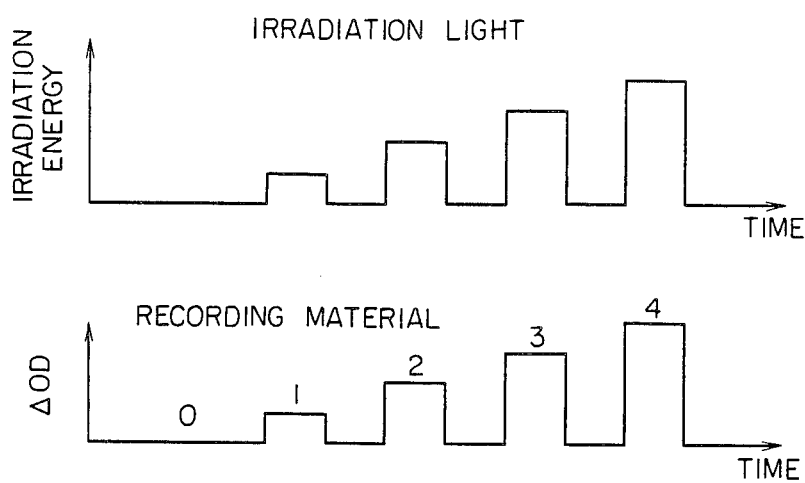
FIG. 6 is a graph showing the correlation between the irradiation energy of light used for writing with the change in optical density of the recording medium in this invention.

A $MoO_3$ film was used as a recording material in a similar structure to that in Example 7, and subjected to optical writing each for 200 msec by using a He-Cd laser ($\lambda = 325$ nm) with different irradiation intensities. The intensity of irradiation light was attenuated to 4 steps by using a NDF (neutral density filter). The irradiated part of the $MoO_3$ film changed to a blue color and thus, as shown in FIG. 6, 4 steps of developed color density change (b) were obtained in correspondence to the irradiation light intensities (a). Investigations conducted to find a recording material in which the developed color density can be effectively controlled by differences in irradiation energy in optical recording have revealed that transition metal oxides including $WO_3$, $MoO_3$, $TiO_2$, $V_2O_5$, $Cr_2O_3$ and $Nb_2O_5$ are usable.

The more the film thickness of the color developing layer, the more of the number of the intermediate steps which can be obtained. Accordingly, a film thickness of from several thousand to several ten thousand Å is preferable.

Although a He-Cd laser was used as the light source for optical writing, other sources including $N_2$ laser, Ar laser, Xe light source, and Hg light source can be used so long as the light is of a wavelength shorter than 440 nm.

EXAMPLE 9

Figure 7:
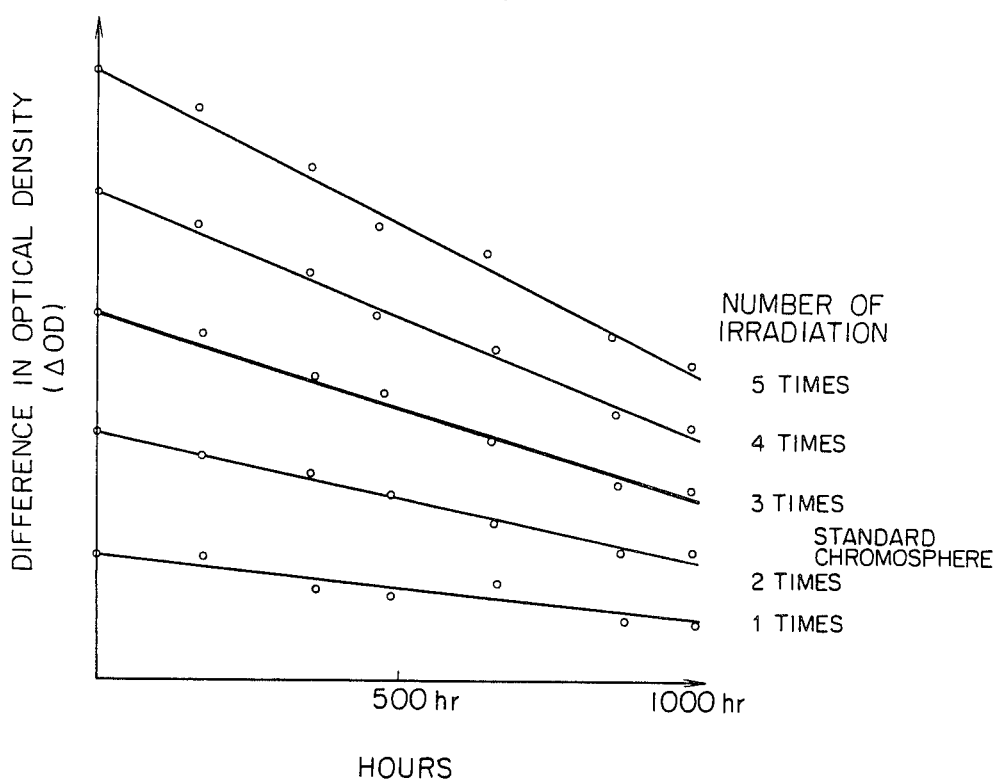
FIG. 7 is a graph showing the change in optical density of the coloration part by optical writing with the lapse of time during storage at high temperature.

Optical recording was conducted with a He-Cd laser ($\lambda = 325$ nm) by using a recording material ($WO_3$) similar to that in Example 7. In light irradiation, the beam diameter was reduced to about 1 $\mu$m by using a lens. The irradiation point was selected as desired by changing the beam path by means of a coil. The irradiation time was about 5 $\mu$s. The gradation of developed color density was controlled by changing in 5 steps the number of times of irradiation applied to the recording part of a recording material (disk) rotating at a constant velocity. A predetermined standard chromosphere was formed with 3 times of irradiation and irradiation recording length of 3 $\mu$m. After recording, the recording material was stored at a high temperature (70° C.) and the deterioration of colored part was measured to give the results shown in FIG. 7. The deterioration occurs at a fixed rate. Accordingly, the rate of error in reading caused by measuring the optical density of individual recording part can be reduced by detecting the degree of deterioration of the standard chromophere and feeding back the value thus obtained.

Although description was made in the above Example of materials in which the light absorption band is changed by light irradiation, other recording materials can also give a high recording density by the same recording method so long as their light reflectivity or transmittance can be changed stepwise in correspondence to the energy intensity of irradiated light. Thus, this invention is not specifically limited as to the recording material.

INDUSTRIAL APPLICABILITY

As described above, according to this invention, in a recording medium utilizing photochromism of transition metal oxides, the recording layer (transition metal oxide layer), or an adhesive or a protective film, which constitutes an upper layer adjacent to the recording layer, is made to contain a proton donor therein, whereby the efficiency of optical density change produced in optical writing is improved, and the resulting product can be used as a recording medium which allows optical writing at a high response speed, namely with a pulse time of 200 ps or shorter, and has an excellent memory effect at high temperature. Further, multiple recording is made possible by changing stepwise the optical density produced by optical writing, and resultantly a high density recording becomes possible. Moreover, development into an erasable recording medium is made possible by providing an erasing electrode.

We claim:

1. A recording medium characterized in that a coloring layer comprising a transition metal oxide is deposited on a substrate, and the said color developing layer or an upper layer adjacent to the said coloring layer contains a proton donor.

2. A recording medium according to claim 1, wherein the transition metal oxide is at least one member selected from the group consisting of $WO_3$, $MoO_3$, $Nb_2O_5$, $TiO_2$, $Cr_2O_3$, $V_2O_5$ and $Ta_2O_5$.

3. A recording medium according to claim 2, wherein the transition metal oxide is $WO_3$ or $MoO_3$.

4. A recording medium according to claim 1, wherein the proton donor is water, an acid, or a compound having an OH group.

5. A recording medium according to claim 1 characterized in that a color developing layer is formed on a substrate, and a protective film formed of a metal oxide or an organic polymer film each containing a proton donor is laminated on the said coloring layer.

6. A recording medium according to claim 1, wherein a protective layer is formed on the coloring layer through an adhesive containing the proton donor interposed between them.

7. A recording medium according to claim 1, wherein the first electrode, the coloring layer, a solid electrolyte, an counter electrode reaction layer, and the counter electrode are laminated on the substrate.

8. A recording medium according to claim 7 characterized in that the solid electrolyte is a proton conduction material.

9. A recording medium according to claim 8, wherein the counter electrode reaction layer is a metal hydroxide layer, a hydrogen-occluding alloy or palladium metal.

10. A recording method which comprises forming a coloring layer comprising a transition metal oxide on a substrate, irradiating the said coloring layer with light of varied intensity or varied number of irradiation, and recording in the form of the state of developed color density of varied, optional degree.

* * * * *